United States Patent
Nissato

(10) Patent No.: US 8,538,618 B2
(45) Date of Patent: Sep. 17, 2013

(54) CLUTCH CONTROL DEVICE OF HYBRID VEHICLE

(75) Inventor: Yukihiro Nissato, Nagoya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 159 days.

(21) Appl. No.: 13/269,181

(22) Filed: Oct. 7, 2011

(65) Prior Publication Data

US 2012/0089285 A1    Apr. 12, 2012

(30) Foreign Application Priority Data

Oct. 8, 2010    (JP) .................................. 2010-228057

(51) Int. Cl.
*B60L 11/00* (2006.01)

(52) U.S. Cl.
USPC ...................... 701/22; 701/67; 701/68; 477/5

(58) Field of Classification Search
None
See application file for complete search history.

(56) References Cited

U.S. PATENT DOCUMENTS

| | | | | |
|---|---|---|---|---|
| 6,223,842 | B1 * | 5/2001 | Masaki | 180/65.23 |
| 7,988,592 | B2 * | 8/2011 | Choi | 477/3 |
| 2005/0256625 | A1 | 11/2005 | Sah et al. | |
| 2007/0202989 | A1 * | 8/2007 | Ortmann et al. | 477/166 |
| 2007/0275823 | A1 * | 11/2007 | Motosugi et al. | 477/176 |
| 2009/0118083 | A1 * | 5/2009 | Kaminsky et al. | 477/5 |
| 2009/0156355 | A1 * | 6/2009 | Oh et al. | 477/5 |

FOREIGN PATENT DOCUMENTS

| | | |
|---|---|---|
| EP | 1 894 805 A2 | 3/2008 |
| EP | 1 950 461 A2 | 7/2008 |
| JP | 3702897 B2 | 10/2005 |
| JP | 2008-2687 A | 1/2008 |
| JP | 2008-120224 A | 5/2008 |
| JP | 2008-185081 A | 8/2008 |
| JP | 2008-303918 A | 12/2008 |
| JP | 2010-188776 A | 9/2010 |
| WO | WO 2009/139305 A1 | 11/2009 |

OTHER PUBLICATIONS

European Search Report issued on Jan. 4, 2012.
Japanese Office Action mailed Oct. 18, 2012 for the corresponding JP Application No. 2010-228057 with an English translation.

* cited by examiner

*Primary Examiner* — Thomas Tarcza
*Assistant Examiner* — Garrett Evans
(74) *Attorney, Agent, or Firm* — Birch, Stewart, Kolasch & Birch LLP

(57) ABSTRACT

A clutch control device of a hybrid vehicle includes a clutch driven by a motor and connected with a drive shaft. A hydraulic unit controls the clutch by oil pressure. An oil temperature detecting unit detects temperature of the oil and a unit which detects vehicle velocity. A control unit which operates through the hydraulic unit switches between an engine driving mode in which the motor shaft and the engine shaft are engaged with each other and a motor driving mode in which the motor shaft and the engine shaft are released and the hybrid vehicle is driven by the motor.

4 Claims, 7 Drawing Sheets

TARGET NUMBER OF REVOLUTIONS OF MOTOR SHAFT : Nmt

TARGET NUMBER OF REVOLUTIONS OF ENGINE SHAFT : Net

[ Net = Nmt - Na ]

CLUTCH CONTROL DEVICE OF HYBRID VEHICLE

BACKGROUND OF THE INVENTION

The present invention relates to a clutch control device of a hybrid vehicle.

A hybrid vehicle equipped with an engine and a motor has various driving modes including an EV driving mode, a series driving mode, and a parallel driving mode. As shown in FIGS. 8 to 10, such hybrid vehicle includes a clutch 35 that engages/releases an engine shaft 32 at an engine 31 side with/from a motor shaft 34 at a motor 33 side, and the hybrid vehicle maintains the clutch 35 in an engaged state/a released state based on the driving mode (see, for example, Japanese Patent No. 3702897B). Any one of a wet type (single plate/multi-plates) and a dry type (single plate/multi-plates) may be used as the clutch. Hereinafter, both types will be referred to as the clutch.

Herein, referring to FIGS. 8 to 10, the relationships between each of the driving modes and the clutch will be described.

In the EV driving mode, a tire 36 of a vehicle 30 is driven by driving the motor 33, as shown in FIG. 8. In this case, the engine 31 stops, electric generation by a generator 37 also stops, and the clutch 35 is in the released state.

In the series driving mode, electricity is generated by the generator 37 by driving the engine 31, and the motor 33 is driven by using electricity generated by the generator 37 as well as electricity charged in a battery (not shown) so that the tire 36 of the vehicle 30 is driven, as shown in FIG. 9. Even in this case, the clutch 35 is in the released state.

Meanwhile, in the parallel driving mode, the tire 36 of the vehicle 30 is driven by driving the engine 31, and the clutch 35 is in the engaged state. As a result, the driving force of the engine 31 is transmitted to the motor shaft 34 side (drive shaft side), as shown in FIG. 10. In the parallel driving mode, the tire 36 of the vehicle 30 may be driven by driving both the engine 31 and the motor 33.

As described above, the vehicle 30 is driven while the clutch 35 is released and the engine shaft 32 and the motor shaft 34 are in a mechanical power-off state, in the EV driving mode and the series driving mode in which the motor 33 is used as a driving force. In contrast, in the parallel driving mode in which the engine 31 is used as a driving force, the vehicle 30 is driven while the clutch 35 is engaged and the engine shaft 32 and the motor shaft 34 are mechanically coupled to each other.

Accordingly, when the driving mode is switched from the EV driving mode or the series driving mode to the parallel driving mode, the clutch 35 having been released is engaged, whereas when the driving mode is switched from the parallel driving mode to the EV driving mode or the series driving mode, the clutch 35 having been engaged is released.

When the driving mode is switched from the parallel driving mode to the series driving mode, the driving force shifts from the engine 31 to the motor 33 by releasing the clutch 35 having been engaged. In this case, an operation of the clutch 35 is performed by a clutch pressure sensor (not shown), but when the clutch pressure sensor is defective, the state of the operation of the clutch 35 cannot be determined thereby causing a secondary defect.

SUMMARY

According to the invention, there is provided a clutch control device of a hybrid vehicle, the clutch control device comprising: a clutch which engages a motor shaft driven by a motor and connected with a drive shaft and an engine shaft driven by an engine with each other, the clutch which releases the motor shaft and the engine shaft from each other; a hydraulic unit which controls the clutch by an oil pressure of an oil; an oil temperature detecting unit which detects an oil temperature of the oil; a vehicle velocity detecting unit which detects a vehicle velocity of the hybrid vehicle; and a control unit which switches a driving mode between an engine driving mode in which the motor shaft and the engine shaft are engaged with each other and the hybrid vehicle is driven by the engine and a motor driving mode in which the motor shaft and the engine shaft are released from each other and the hybrid vehicle is driven by the motor, by controlling the clutch through the hydraulic unit, the control unit which, when the driving mode is switched from the engine driving mode to the motor driving mode, acquires a response time in which a state of the clutch is changed from an engaged state to a released state based on the oil temperature and the vehicle velocity, determines that the clutch is released, after the response time elapses after starting to control the clutch to release the motor shaft and engine shaft from each other, and permits control in the motor driving mode.

DETAILED DESCRIPTION OF EMBODIMENTS

Hereinafter, a clutch control device of a hybrid vehicle according to exemplary embodiments of the present invention will be described with reference to FIGS. 1 to 7.

First Exemplary Embodiment

Figure 1:
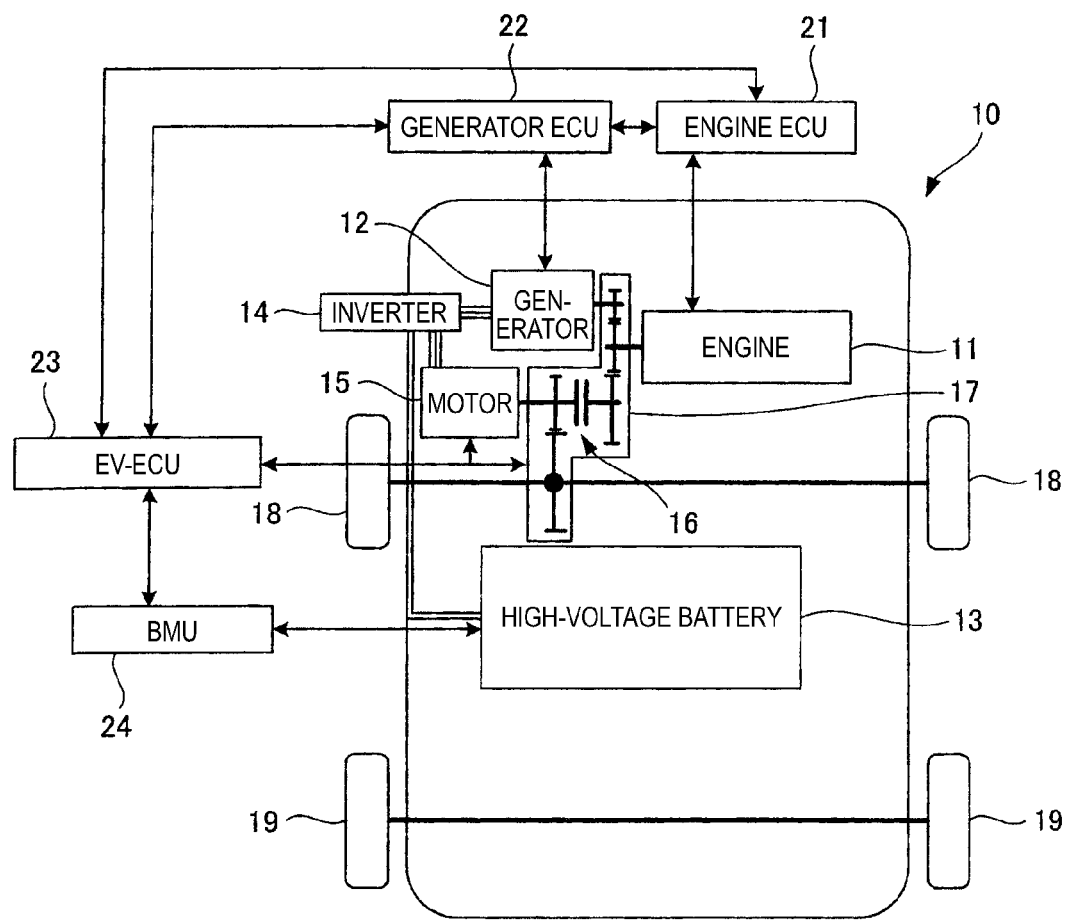
FIG. 1 is a configuration diagram of a vehicle having a clutch control device of a hybrid vehicle according to the present invention.
Figure 2:
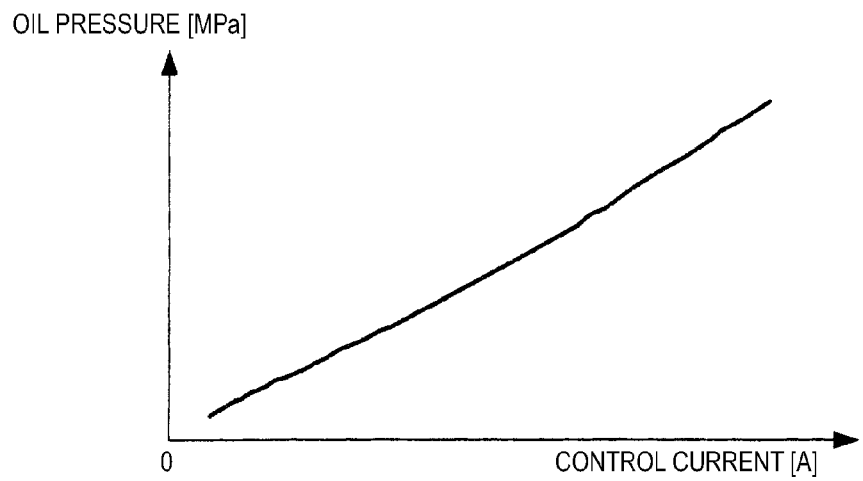
FIG. 2 is a graph illustrating a hydraulic characteristic of a hydraulic control valve.
Figure 3:
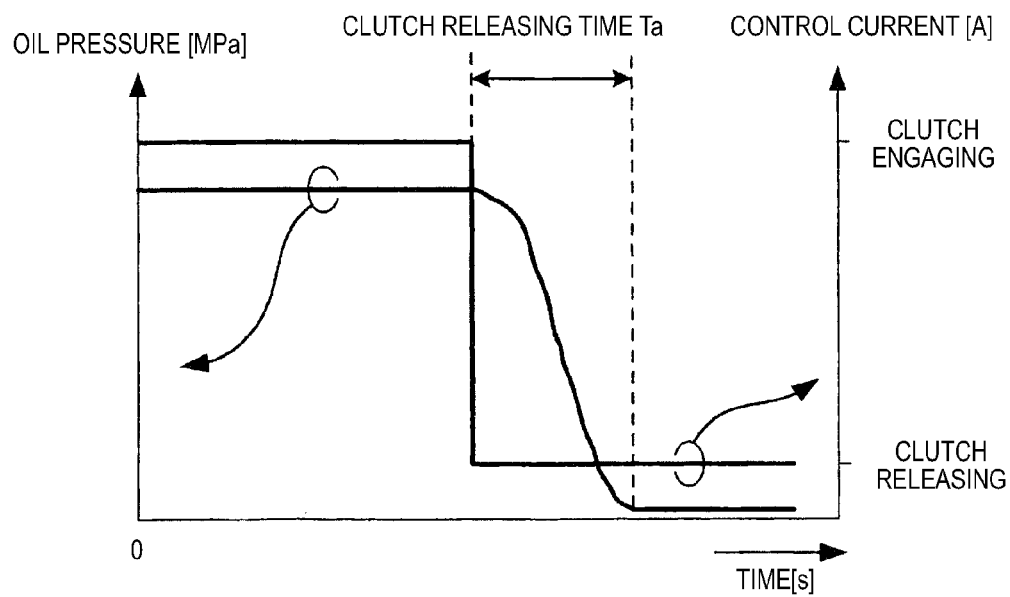
FIG. 3 is a graph illustrating a hydraulic responsiveness of the hydraulic control valve.
Figure 4:
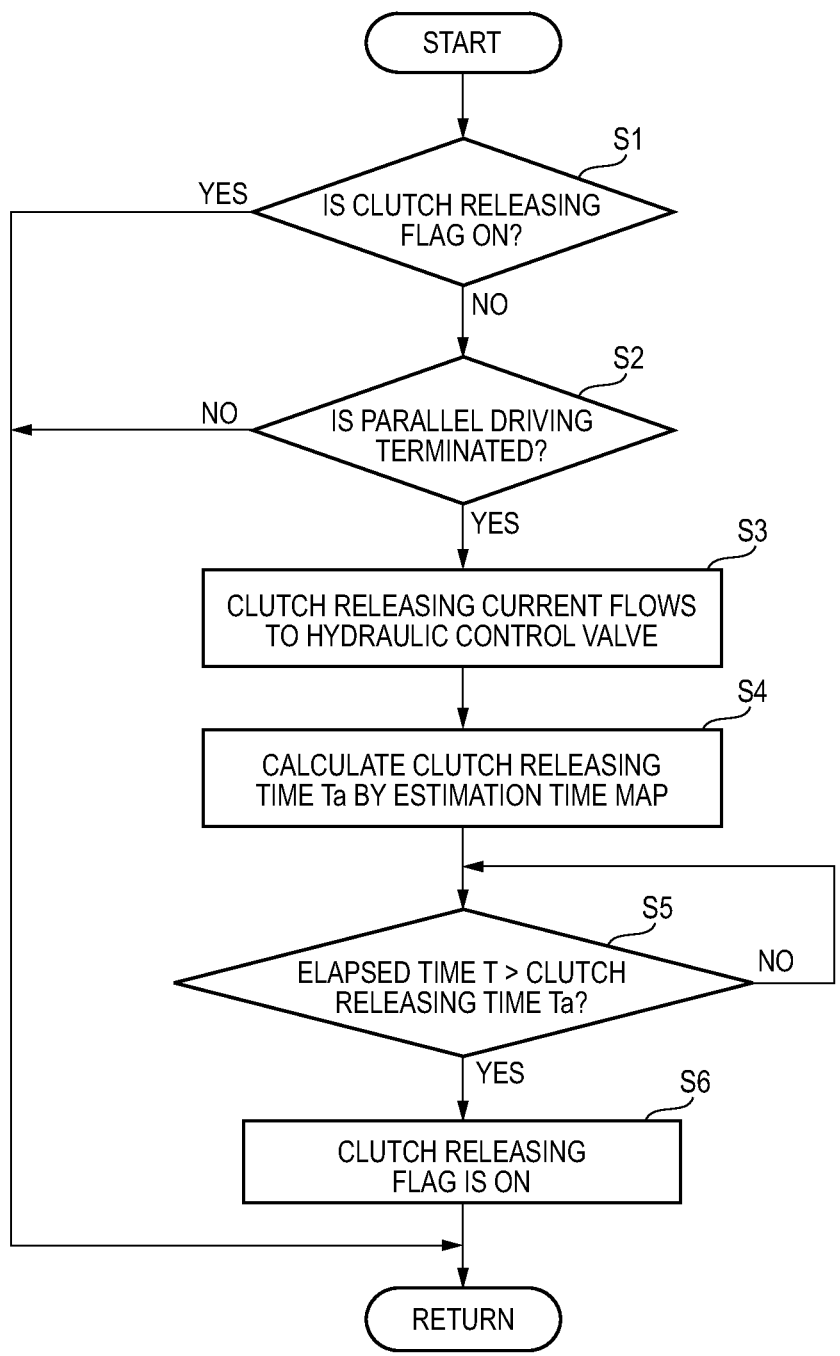
FIG. 4 is a flowchart illustrating the control in the clutch control device of the hybrid vehicle according to the present invention.
Figure 5:
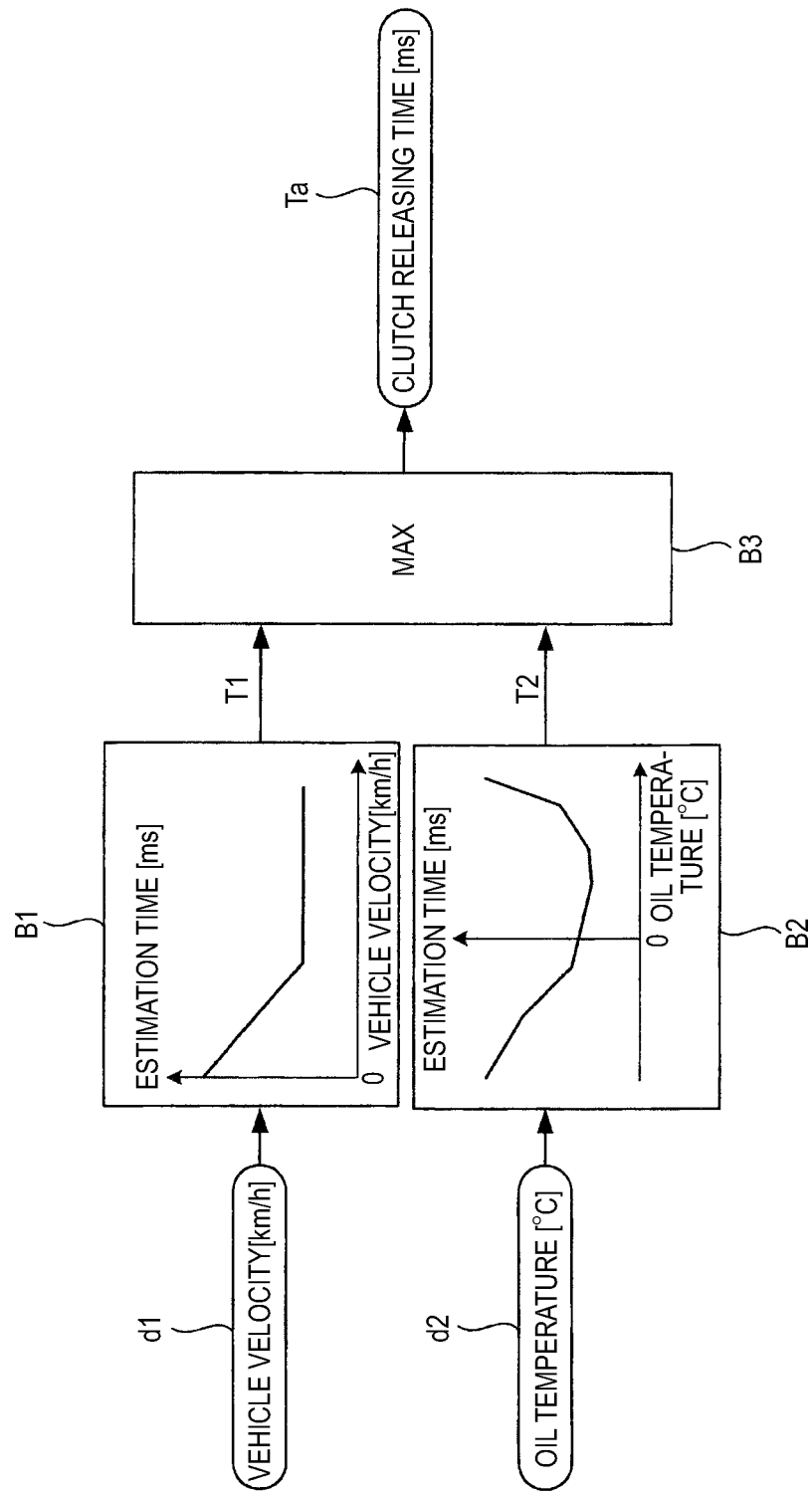
FIG. 5 is a block diagram when a clutch releasing time is calculated in the clutch control device of the hybrid vehicle according to the present invention.

FIG. 1 is a configuration diagram of a vehicle having a clutch control device of a hybrid vehicle according to the present invention. FIG. 2 is a graph illustrating a hydraulic characteristic of a hydraulic control valve, and FIG. 3 is a graph illustrating hydraulic responsiveness of the hydraulic control valve. FIGS. 4 and 5 are drawings illustrating control in the clutch control device of the hybrid vehicle of the present invention. FIG. 4 is a flowchart illustrating the control and FIG. 5 is a block diagram when a clutch releasing time is calculated.

In the clutch control device of the hybrid vehicle according to the present exemplary embodiment, a vehicle 10 is a hybrid vehicle using an engine 11 and a motor 15 as a power source, as shown in FIG. 1. Specifically, the vehicle 10 includes the engine 11 serving as the power source for electric generation while driving the vehicle, a generator 12 driven by the engine 11 to generate electricity, a high-voltage battery 13 charging electricity generated by the generator 12, and a motor 15 receiving electricity from the generator 12 and the high-voltage battery 13 through an inverter 14 and using at least one of the electricity generated by the generator 12 and the electricity charged in the high-voltage battery 13, to drive the vehicle 10.

The motor 15 drives a drive shaft of a front wheel 18 and is connected with the drive shaft of the front wheel 18 through a gear box (transmission) 17 (specifically, through a differential in the gear box 17). Meanwhile, the engine 11 is also connected with the front wheel 18 through the gear box 17, but connected with the front wheel 18 through a clutch 16 (further, through the differential in the gear box 17) installed in the gear box 17 when driving the drive shaft of the front wheel 18. The clutch 16 is controlled by a hydraulic control valve (a hydraulic unit; not shown) such as a solenoid and specifically, engages/releases an engine shaft (see an engine shaft 25 in FIG. 7 to be described below) of the engine 11 and a motor shaft (see a motor shaft 26 in FIG. 7 to be described below) of the motor 15 to/from each other. Since the clutch 16 and the gear box 17 may have any configurations, a detailed description thereof will be omitted herein. The clutch 16 may be separated from the gear box 17 and further, any one of a wet type (single/multi-plates) and a dry type (single/multi-plates) may be used as the clutch 16.

In the exemplary embodiment, as an example, the motor 15 is installed at the front wheel 18 side, but a motor driving a rear wheel 19 may be further installed. In the exemplary embodiment, a hybrid vehicle in which the engine 11 is driven and electricity is generated by the generator 12 to charge the generated electricity in the high-voltage battery 13, is exemplified, but a plug-in hybrid vehicle in which the high-voltage battery 13 can be charged from a household power supply or a quick charger outside the vehicle may be used.

The vehicle 10 includes an engine electronics control unit (ECU) 21 controlling the engine 11, a generator ECU 22 controlling the generator 12, and an EV-ECU (vehicle integrated controller, a control unit) 23 controlling the high-voltage battery 13, the motor 15, and the gear box 17 (the clutch 16). The high-voltage battery 13 is connected with the EV-ECU 23 through a battery management unit (BMU) 24 managing the high-voltage battery 13. The BMU 24 monitors voltage, current, temperature, and state of charge (SOC) of the high-voltage battery 13 and calculates a possible battery output based on the temperature and the SOC and notifies the voltage, the current, the temperature, and the SOC to the EV-ECU 23.

The engine ECU 21, the generator ECU 22, and the EV-ECU 23 can transmit and receive information to and from each other by using, for example, a controller area network (CAN). In the clutch control device according to the exemplary embodiment, the EV-ECU 23 controls the clutch 16, depending on the vehicle velocity and required driving force of the vehicle 10, to switch the EV driving in which the battery is used, the series driving in which the combination of the battery and the engine is used, and the parallel driving in which the engine is used, by performing the clutch control to be described below.

The EV-ECU 23 detects the vehicle velocity of the vehicle 10 from a vehicle velocity sensor (a vehicle velocity detecting unit, not shown) and acquires the required driving force based on an opening degree of an accelerator detected from an accelerator pedal (not shown). The EV-ECU detects an oil temperature of clutch oil of the clutch 16 from an oil temperature sensor (an oil temperature detecting unit, not shown) of the clutch 16 and individually detects the number of revolutions of the engine shaft (the engine shaft 25 of FIG. 7) of the engine 11 and the number of revolutions of the motor shaft (the motor shaft 26 of FIG. 7) of the motor 15 from a plurality of independent revolution sensors (a motor shaft revolution detecting unit and an engine shaft revolution detecting unit, not shown).

First, referring to FIGS. 2 and 3, a hydraulic characteristic and hydraulic responsiveness of a hydraulic control valve will be described.

The hydraulic control valve (a solenoid valve) controlling the engaging/releasing of the clutch 16 has a hydraulic characteristic that monotonically increases substantially in proportion to a control current from the EV-ECU 23, as shown in the graph of FIG. 2 and the EV-ECU 23 controls the hydraulic control valve by controlling the control current depending on the hydraulic characteristic.

Meanwhile, since a mechanical delay time is generated in the hydraulic control valve, a delay time is generated even in a change of the hydraulic pressure supplied to the clutch 16, and a delay time is generated even in responsiveness of the clutch 16. For example, when releasing the clutch 16, even though the control current from the EV-ECU 23 is changed from a clutch engaging control current to a clutch releasing control current, the delay time is generated in the change of the hydraulic pressure supplied to the clutch 16, and as a result, a response time represented by a clutch releasing time Ta is required until the clutch 16 having been engaged is fully released, as shown in the graph of FIG. 3. Therefore, when a predetermined response time is set, even though the clutch pressure sensor is defective, a secondary defect can be prevented from occurring. However, since the clutch releasing time Ta depends on the vehicle velocity and the oil temperature of the clutch, as described in FIG. 5 to be described below, the secondary defect cannot be fully prevented from occurring only by setting the predetermined response time.

Therefore, in the exemplary embodiment, the clutch control to be described below is performed based on the flowchart shown in FIG. 4 and the block diagram shown in FIG. 5. Hereinafter, a control sequence in the EV-ECU 23 will be described according to the flowchart of FIG. 4.

(Step S1)
In the EV-ECU 23, it is checked whether or not a clutch releasing flag is ON. When the clutch releasing flag is ON, since the clutch 16 is in a released state and a vehicle is in the EV driving or the series driving, a series of control sequences are terminated, and when the clutch releasing flag is not ON, since the clutch 16 is in an engaged state and the vehicle is in parallel driving, the process proceeds to step S2.

(Step S2)
It is checked whether or not the parallel driving is terminated. For example, when the vehicle velocity of the vehicle 10 becomes a velocity at which the driving mode is changed from the parallel driving to the EV driving or the series driving, the parallel driving is terminated. When the parallel driving is terminated, the process proceeds to step S3, and when the parallel driving is not terminated, the series of control sequences are terminated.

(Step S3)

The clutch releasing control current flows to the hydraulic control valve from the EV-ECU 23, and the process proceeds to step S4.

(Step S4)

The clutch releasing time Ta (the response time) is calculated by an estimation time map.

The calculation of the clutch releasing time Ta will be described with reference to FIG. 5. In regard to the clutch releasing time Ta, a first estimation time T1 for a vehicle velocity d1 is acquired from an estimation time map for the vehicle velocity in a first calculating unit B1, a second estimation time T2 for an oil temperature d2 of the clutch 16 is acquired from an estimation time map for the oil temperature in a second calculation unit B2, and the larger one of the first estimation time T1 and the second estimation time T2 is set to the clutch releasing time Ta in a third calculation unit B3, as shown in FIG. 5.

The estimation time for the vehicle velocity tends to decrease in inverse proportion to the increase of the vehicle velocity until a predetermined vehicle velocity and tends to be constant after the predetermined vehicle velocity, as shown in the map of the first calculation unit B1. Meanwhile, the estimation time for the oil temperature tends to decrease substantially in inverse proportion to the increase of the oil temperature until a predetermined oil temperature and tends to increase substantially in proportion to the increase of the oil temperature after the predetermined oil temperature, as shown in the map of the second calculation unit B2.

As described above, the clutch releasing time Ta is acquired by the vehicle velocity of the vehicle 10 and the oil temperature of the clutch 16, and after the calculation of the clutch releasing time Ta, the process proceeds to step S5.

(Step S5)

Until an elapsed time T after the clutch releasing control current starts to flow passes the calculated clutch releasing time Ta, the process stands by. After the elapsed time T passes the clutch releasing time Ta, the process proceeds to step S6.

(Step S6)

In the EV-ECU 23, the clutch releasing flag is ON. As a result, a subsequent control, that is, the controls in the EV driving and the series driving are permitted and executed.

As described above, in the exemplary embodiment, the clutch releasing time Ta is acquired from the vehicle velocity of the vehicle 10 and the oil temperature of the clutch 16, and after the acquired clutch releasing time Ta elapses, that is, after the time when the clutch 16 having been engaged is fully released elapses, the subsequent control is permitted, such that even though the clutch pressure sensor is defective, the secondary defect can be prevented from occurring.

Second Exemplary Embodiment

Figure 6:
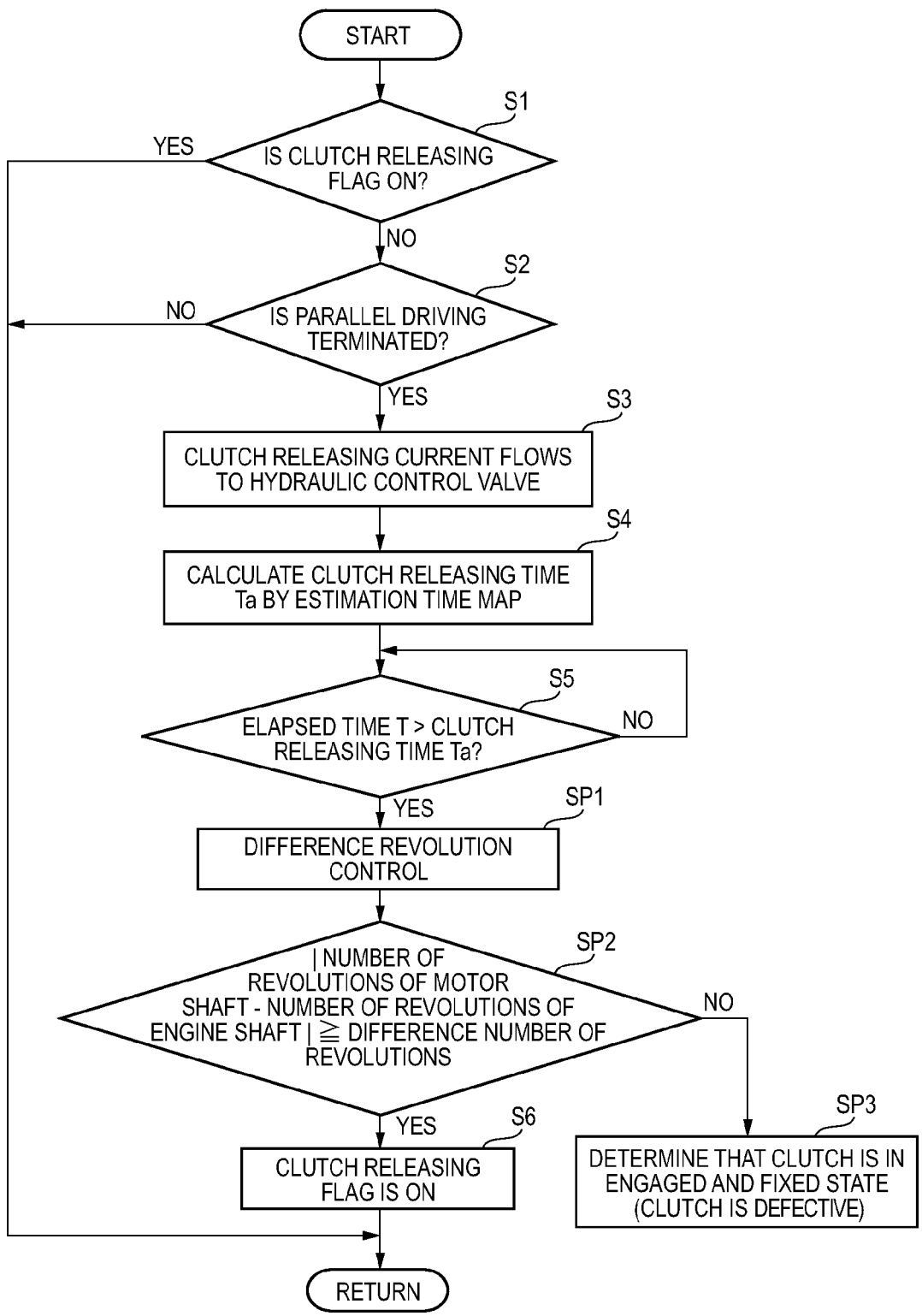
FIG. 6 is a flowchart illustrating another control in a clutch control device of a hybrid vehicle according to the present invention.
Figure 7:
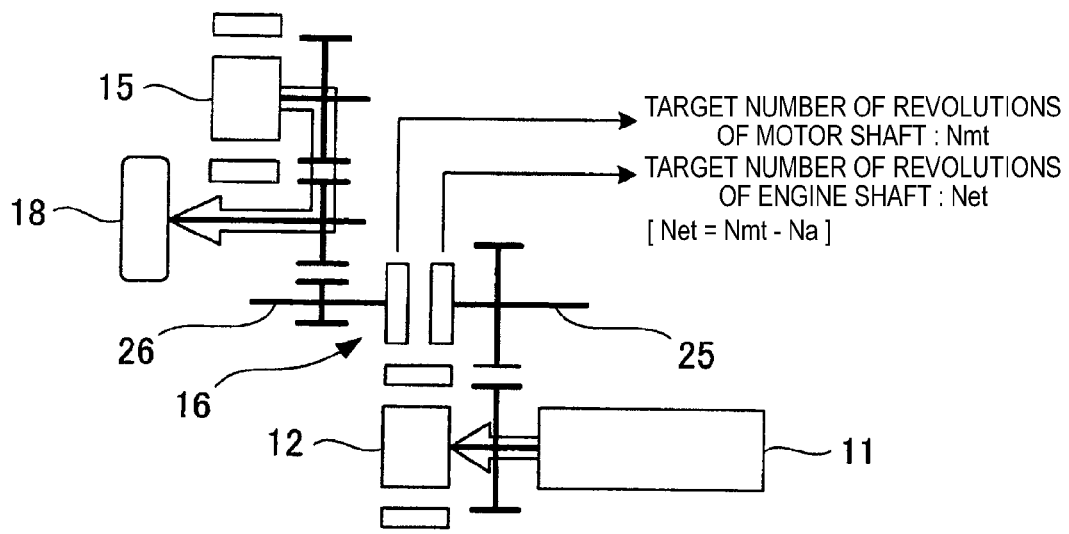
FIG. 7 is a diagram illustrating a difference revolution control in the flowchart shown in FIG. 6.
Figure 8:
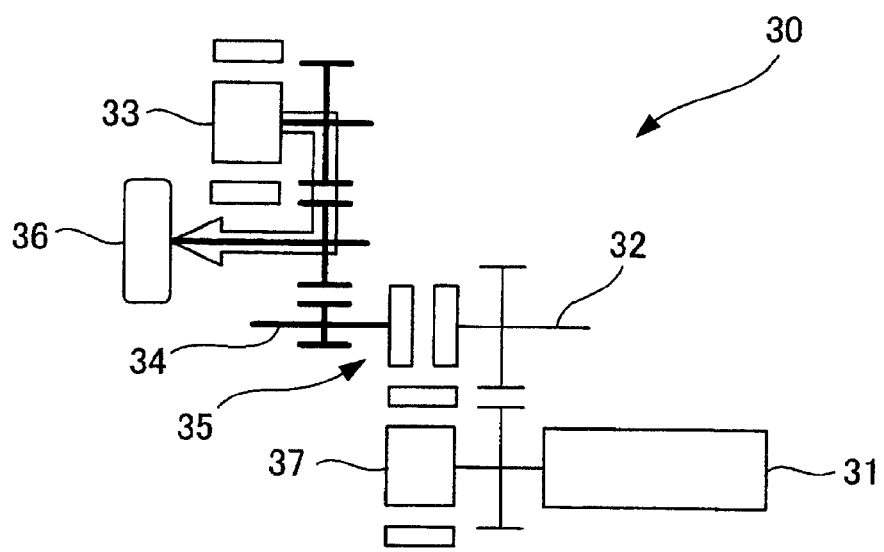
FIG. 8 is a schematic diagram illustrating an EV driving mode in a hybrid vehicle.
Figure 9:
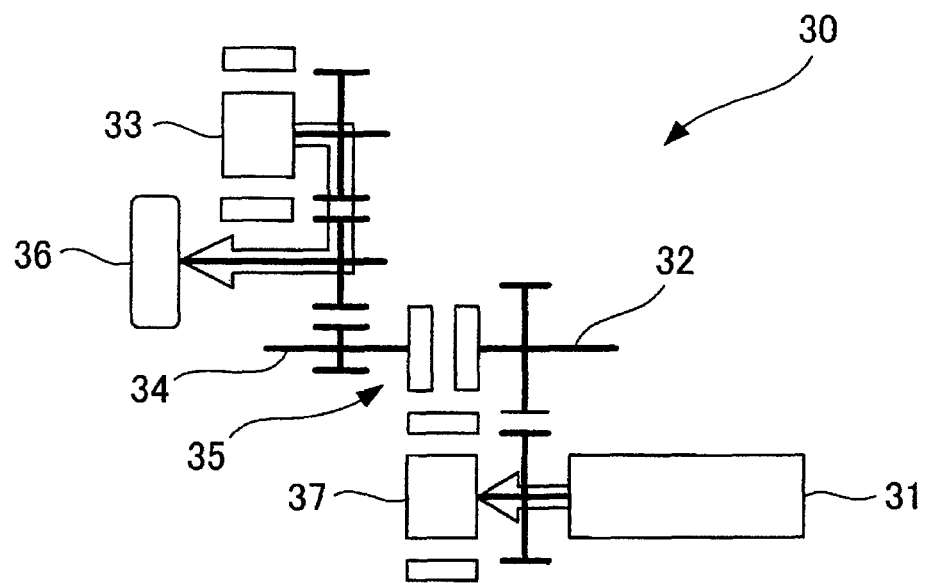
FIG. 9 is a schematic diagram illustrating a series driving mode in the hybrid vehicle.
Figure 10:
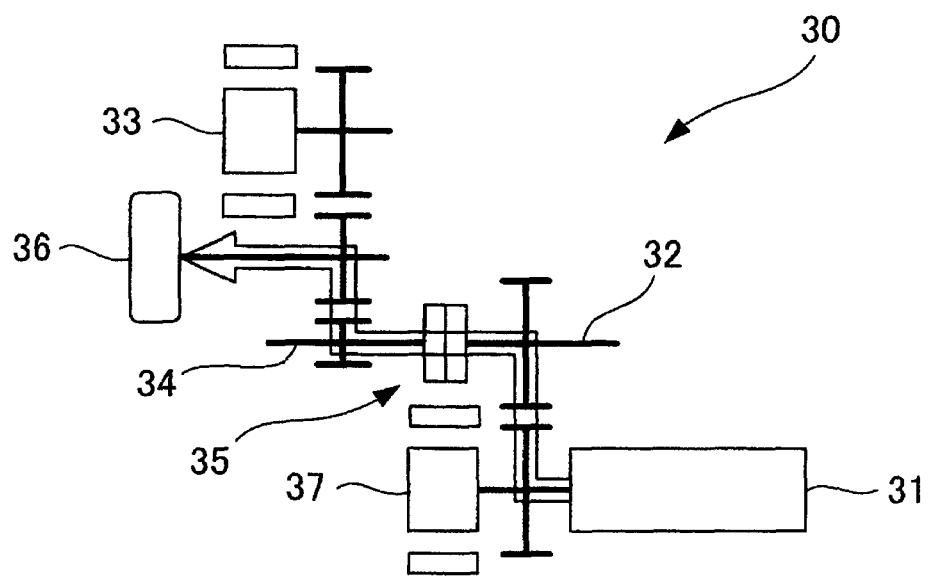
FIG. 10 is a schematic diagram illustrating a parallel driving mode in the hybrid vehicle.

FIGS. 6 and 7 are diagrams illustrating another control in a clutch control device of a hybrid vehicle according to the present invention. FIG. 6 is a flowchart illustrating the control and FIG. 7 is a diagram illustrating a difference revolution control.

In the present exemplary embodiment, the clutch control to be described below is performed based on the flowchart shown in FIG. 6 and the diagram shown in FIG. 7. However, the clutch control device of the hybrid vehicle according to the second exemplary embodiment may have the same configuration as the clutch control device of the hybrid vehicle according to the first exemplary embodiment shown in FIG. 1. The flowchart of FIG. 6 is the same as the flowchart of FIG. 4 according to the first exemplary embodiment except for control sequences of steps SP1 to SP3 inserted between steps S5 and S6. Therefore, herein, a duplicated description is omitted or simplified.

Hereinafter, the control sequences in the EV-ECU 23 will be described according to the flowchart of FIG. 6.

(Step S1)

In the EV-ECU 23, it is checked whether or not a clutch releasing flag is ON. When the clutch releasing flag is ON, a series of control sequences are terminated, and when the clutch releasing flag is not ON, the process proceeds to step S2.

(Step S2)

It is checked whether or not the parallel driving is terminated. When the parallel driving is terminated, the process proceeds to step S3, and when the parallel driving is not terminated, the series of control sequences are terminated.

(Step S3)

The clutch releasing control current flows to the hydraulic control valve from the EV-ECU 23, and the process proceeds to step S4.

(Step S4)

A clutch releasing time Ta is calculated by an estimation time map, and after the calculation, the process proceeds to step S5.

(Step S5)

An elapsed time T passes the clutch releasing time Ta, and thereafter, the process proceeds to step SP1. The clutch releasing time Ta may be provided to obtain a start timing of the difference revolution control in the next step SP1.

(Step SP1)

After the elapsed time T passes the clutch releasing time Ta, the difference revolution control is performed in order to check whether or not the motor shaft and the engine shaft are mechanically powered off. The difference revolution control will be described below with reference to FIG. 7. In the difference revolution control, while the motor shaft 26 is rotated at a target number of revolutions of the motor shaft Nmt [rpm] that is required for the driving by controlling the motor 15, the engine shaft 25 is rotated at a target number of revolutions of the engine shaft Net [rpm] that is different from the target number of revolutions of the motor shaft Nmt by a predetermined number of revolutions (for example, 100 rpm) by controlling the engine 11. The target number of revolutions of the engine shaft Net is set to a number of revolutions acquired by subtracting a difference number of revolutions Na [rpm] from the target number of revolutions of the motor shaft Nmt so as to be different from the target number of revolutions of the motor shaft Nmt. The target number of revolutions of the engine shaft Net set in the difference revolution control may be set to a deceleration side in order to prevent a rapid acceleration of the vehicle 10, taking into consideration of the case where the clutch 16 is defective. As a result, the equation, [Target number of revolutions of Engine shaft Net=Target number of revolutions of Motor shaft Nmt−Difference number of revolutions Na] is met.

(Step SP2)

During the above mentioned difference revolution control, while individually detecting the number of revolutions of the engine shaft 25 and the number of revolutions of the motor shaft 26 with the revolution sensors, it is checked whether or not the detected number of revolutions of the engine shaft Ne and the detected number of revolutions of the motor shaft Nm meet Equation 1 below. When the number of revolutions of the engine shaft Ne and the number of revolutions of the motor shaft Nm meet Equation 1, the process proceeds to step S6, and when the number of revolutions of the engine shaft Ne and the number of revolutions of the motor shaft Nm do not meet Equation 1, the process proceeds to step SP3.

$$|\text{Number of revolutions of Motor shaft } Nm - \text{Number of revolutions of Engine shaft } Ne| \geq \text{Difference number of revolutions } Na \quad \text{Equation 1}$$

(Step S6)

When the clutch 16 is not defective and the clutch 16 is fully released, the number of revolutions of the motor shaft Nm is equal to the target number of revolutions of the motor shaft Nmt and the number of revolutions of the engine shaft Ne is equal to the target number of revolutions of the engine shaft Net, and therefore the number of revolutions of the motor shaft Nm and the number of revolutions of the engine shaft Ne meet Equation 1. Accordingly, when Equation 1 is met, it is verified that the clutch 16 is released, so that the clutch releasing flag is ON in the EV-ECU 23. As a result, subsequent control, that is, the controls in the EV driving and the series driving are permitted and executed.

(Step SP3)

Meanwhile, if the clutch 16 is in the engaged state due to a defect (for example, fixation) of the clutch 16, the number of revolutions of the motor shaft Nm is not equal to the target number of revolutions of the motor shaft Nmt, and the number of revolutions of the engine shaft Ne is not equal to the target number of revolutions of the engine shaft Net. And, the number of revolutions of the motor shaft Nm and the number of revolutions of the engine shaft Ne become to be synchronized with each other, so that the number of revolutions of the motor shaft Nm and the number of revolutions of the engine shaft Ne cannot meet Equation 1. Therefore, when Equation 1 is not met, it may be determined that the clutch 16 is in the engaged state (or in a half-clutch) which is the defective state, and the clutch releasing flag is not ON in the EV-ECU 23. As a result, by preventing the subsequent controls, that is, the controls in the EV driving and the series driving, a secondary defect can be prevented from occurring.

As described above, in the exemplary embodiment, the clutch releasing time Ta is acquired from the vehicle velocity of the vehicle 10 and the oil temperature of the clutch 16, and after the acquired clutch releasing time Ta elapses, the difference revolution control is performed and it is determined whether or not the clutch 16 is defective. Since it is determined whether or not the subsequent controls are permitted or refused based on the result of the determination, even though a clutch pressure sensor is defective, the secondary defect can be prevented from occurring. Further, since the defect of the clutch 16 is determined, the defect of the clutch 16 can also be notified based on the result of the determination.

The present invention is suitable for a hybrid vehicle.

What is claimed is:

1. A clutch control device of a hybrid vehicle, the clutch control device comprising:
    a clutch which engages a motor shaft driven by a motor and connected with a drive shaft and an engine shaft driven by an engine with each other, the clutch which releases the motor shaft and the engine shaft from each other;
    a hydraulic unit which controls the clutch by an oil pressure of an oil;
    an oil temperature detecting unit which detects an oil temperature of the oil;
    a vehicle velocity detecting unit which detects a vehicle velocity of the hybrid vehicle; and
    a control unit which switches a driving mode between an engine driving mode in which the motor shaft and the engine shaft are engaged with each other and the hybrid vehicle is driven by the engine and a motor driving mode in which the motor shaft and the engine shaft are released from each other and the hybrid vehicle is driven by the motor, by controlling the clutch through the hydraulic unit, the control unit which, when the driving mode is switched from the engine driving mode to the motor driving mode, acquires a response time in which a state of the clutch is changed from an engaged state to a released state based on the oil temperature and the vehicle velocity, determines that the clutch is released, after the response time elapses after starting to control the clutch to release the motor shaft and engine shaft from each other, and permits control in the motor driving mode.

2. The clutch control device according to claim 1 further comprising:
    a first detecting unit which detects a number of revolutions of the motor shaft; and
    a second detecting unit which detects a number of revolutions of the engine shaft, wherein
    the control unit, after the response time elapses after starting to control the clutch to release the motor shaft and engine shaft from each other, controls the motor to rotate the motor shaft at a target number of revolutions of the motor shaft that is required for driving and controls the engine to rotate the engine shaft at a target number of revolutions of the engine shaft that is different from the target number of revolutions of the motor shaft by a predetermined number of revolutions, and
    the control unit determines that the clutch is released, when a difference between the detected number of revolutions of the motor shaft and the detected number of revolutions of the engine shaft is equal to or greater than the predetermined number of revolutions, and permits the control in the motor driving mode.

3. The clutch control device according to claim 2, wherein the control unit determines that the clutch is defective, when the difference between the detected number of revolutions of the motor shaft and the detected number of revolutions of the engine shaft is less than the predetermined number of revolutions, and prevents the control in the motor driving mode.

4. The clutch control device according to claim 1, wherein the control unit acquires a first estimation time for the vehicle velocity based on a first estimation time map for the vehicle velocity,
    the control unit acquires a second estimation time for the oil temperature based on a second estimation time map for the oil temperature, and
    the control unit sets larger one of the first estimation time and the second estimation time as the response time.

* * * * *